United States Patent
Brandao

(10) Patent No.: US 11,152,990 B1
(45) Date of Patent: Oct. 19, 2021

(54) SIMPLIFIED TCAS SURVEILLANCE

(71) Applicant: Honeywell International Inc., Morris Plains, NJ (US)

(72) Inventor: Ruy C. Brandao, Redmond, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/850,343

(22) Filed: Apr. 16, 2020

(51) Int. Cl.
*H04B 7/06* (2006.01)
*G08G 5/00* (2006.01)
*H01Q 3/34* (2006.01)

(52) U.S. Cl.
CPC ......... *H04B 7/0617* (2013.01); *G08G 5/0013* (2013.01); *H01Q 3/34* (2013.01)

(58) Field of Classification Search
CPC .. H01Q 1/28; H01Q 3/00; H01Q 3/04; H01Q 3/06; H01Q 3/26; H01Q 3/36; H01Q 3/267; H01Q 21/20; H01Q 25/00; H01Q 21/00; H04B 7/0617; H04B 7/18506; H04B 17/12; H04B 1/40; H04B 17/21; H04B 17/27; G01S 3/04; G01S 3/023; G01S 5/0072; G01S 11/02; G01S 13/02; G01S 13/04; G01S 13/42; G01S 13/74; G01S 13/765; G01S 13/767; G01S 13/93; G01S 13/933; G01S 13/953; G08G 1/166; G08G 3/02; G08G 5/004; G08G 5/0008; G08G 5/0013; G08G 5/0021; G08G 5/0069; G08G 5/0078; G08G 5/04; G08G 5/045; G08G 7/02; G08G 9/02
See application file for complete search history.

(56) References Cited

U.S. PATENT DOCUMENTS

| | | | | |
|---|---|---|---|---|
| 4,713,669 A | * | 12/1987 | Shuch | G01S 13/933 342/455 |
| 7,385,560 B1 | * | 6/2008 | Maloratsky | H01Q 1/28 343/705 |
| 7,482,976 B2 | * | 1/2009 | Piesinger | H01Q 3/267 342/368 |
| 7,576,686 B2 | * | 8/2009 | Needham | G01S 7/4017 342/165 |
| 7,978,121 B2 | | 7/2011 | Brandao et al. | |
| 8,049,662 B2 | * | 11/2011 | Stayton | H01Q 3/267 342/174 |

(Continued)

OTHER PUBLICATIONS

U.S. Appl. No. 16/892,029, by Honeywell International Inc. (Inventor: Brandao), filed Jun. 3, 2020.

(Continued)

*Primary Examiner* — Quochien B Vuong
(74) *Attorney, Agent, or Firm* — Shumaker & Sieffert, P.A.

(57) ABSTRACT

A traffic collision avoidance system (TCAS), configured to transmit a wide transmit beam of approximately 180 degrees. The wide transmit beam may be, for example at the interrogation frequency or a transponder response frequency. The TCAS of this disclosure includes a directional antenna system with two signal input ports and two or more antenna elements. In some examples, the direction of the 180 degree beam may be controlled by the phase relationship between the signals input to the two port antenna. In other examples, the direction of the transmit beam from the antenna system is predefined to be in two complementary directions (e.g., forward and aft).

20 Claims, 5 Drawing Sheets

(56) References Cited

U.S. PATENT DOCUMENTS

| | | | |
|---|---|---|---|
| 8,242,951 B2 | 8/2012 | Brandao et al. | |
| 8,604,985 B1 | 12/2013 | Wolf et al. | |
| 8,897,717 B2 | 11/2014 | Ferguson et al. | |
| 8,976,057 B1 * | 3/2015 | Jacobson | G01S 3/14 342/29 |
| 9,024,812 B2 * | 5/2015 | Smith | G01S 3/48 342/174 |
| 9,223,019 B2 | 12/2015 | Zeng et al. | |
| 9,997,826 B2 * | 6/2018 | Oey | H01Q 1/1207 |
| 10,609,517 B2 * | 3/2020 | Perdew | H04W 4/40 |

OTHER PUBLICATIONS

U.S. Appl. No. 16/949,690, by Honeywell International Inc. (Inventors: Brandao et al.), filed Nov. 11, 2020.
U.S. Department of Transportation, "Introduction to TCAS II," Version 7.1, HQ-111358, Feb. 28, 2011, 50 pp.

* cited by examiner

SIMPLIFIED TCAS SURVEILLANCE

TECHNICAL FIELD

The disclosure relates to position reporting for vehicles.

BACKGROUND

The traffic collision avoidance system (TCAS) is a system onboard some aircraft, which includes an active transponder, a display and an antenna system. TCAS may operate independent of air traffic control, to warns pilots of the presence of other transponder-equipped aircraft which may present a threat of mid-air collision. TCAS equipped vehicles transmit an interrogation signal and respond to interrogations from other vehicles. The TCAS processing circuitry on a first vehicle uses information received from other vehicles to determine the location of other vehicles in 3D space and extrapolate future positions of the first vehicle along with the other vehicles to determine if a risk of collision exists. Vehicles may include aircraft, drones, other unmanned aerial systems (UAS), and air mobility devices.

SUMMARY

In general, the disclosure directed to a TCAS, configured to transmit a wide transmit beam of approximately 180 degrees. In some examples, the wide transmit beam may be at an interrogation frequency. The TCAS of this disclosure includes a directional antenna system with two signal input ports and two or more antenna elements. In some examples, the direction of the 180 degree beam may be controlled by the phase relationship between the signals input to the two port antenna. In other examples, the direction of the transmit beam from the antenna system is predefined to be in two complementary directions (e.g., forward and aft).

In one example, the disclosure is directed to a Traffic Collision Avoidance System (TCAS) antenna device, the antenna device comprising: a plurality of antenna elements; two input ports configured to receive input signals comprising a TCAS message; and a beamforming network configured to receive the input signals via the two input ports and transmit the TCAS message via the two or more antenna elements, wherein a beam width of a transmit beam that includes the transmitted TCAS message is approximately 180 degrees in azimuth, and wherein the beam width and beam direction are based on a phase and amplitude of the input signal received at the two input ports.

In another example, the disclosure is directed to a Traffic Collision Avoidance System (TCAS), the system comprising: a TCAS antenna device comprising: a plurality antenna elements; two input ports configured to receive input signals comprising a TCAS message; and a beamforming network configured to receive the input signals via the two input ports and transmit the TCAS message via the two or more antenna elements, wherein a beam width of a transmit beam that includes the transmitted TCAS message is approximately 180 degrees in azimuth, and wherein the beam width and beam direction are based on the input signal received at the two input ports; and processing circuitry configured to: generate the input signals received by the two input ports; adjust one or more characteristics of the input signals to control the beam width and the beam direction of the interrogation transmit beam.

In another example, the disclosure is directed to a method comprising: determining, by processing circuitry, a phase relationship between a first signal and a second signal; causing, by the processing circuitry, transmitter circuitry to generate the first signal and the second signal, such that the first signal and the second signal have the determined phase relationship; causing, by the processing circuitry, the transmitter circuitry to output the first signal via a first transmission element and the second signal via a second transmission element, wherein: the first transmission element is coupled to a first input port of a Traffic Collision Avoidance System (TCAS), the second transmission element is coupled to a second input port of the TCAS, wherein the TCAS comprises a plurality of antenna elements coupled to the first input port and the second input port, the first signal and the second signal cause the plurality of antenna elements to output a TCAS transmit beam, wherein the TCAS transmit beam has a beam width of approximately 180 degrees in azimuth.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes techniques related to a traffic collision avoidance systems (TCAS) that can be configured to transmit a wide transmit beam of approximately 180 degrees. In some examples, the wide transmit beam may be output at the interrogation frequency of 1030 MHz, or other frequencies. The TCAS of this disclosure includes a directional antenna system with two signal input ports and two or more antenna elements. In some examples, the direction of the 180 degree beam may be controlled by the phase relationship between the signals input to the two port antenna. In some examples, the direction of the transmit beam from the antenna system is predefined to be in two complementary directions (e.g., forward and aft).

In some examples, TCAS antenna systems are designed to transmit four transmit beams in four directions. The TCAS antenna system of this disclosure may transmit one or two wide transmit beams in any direction, which may enable several advantages, such as simplified installation with only two cables to the directional antenna, over a four-beam TCAS which requires four coaxial cables.

Figure 1A:
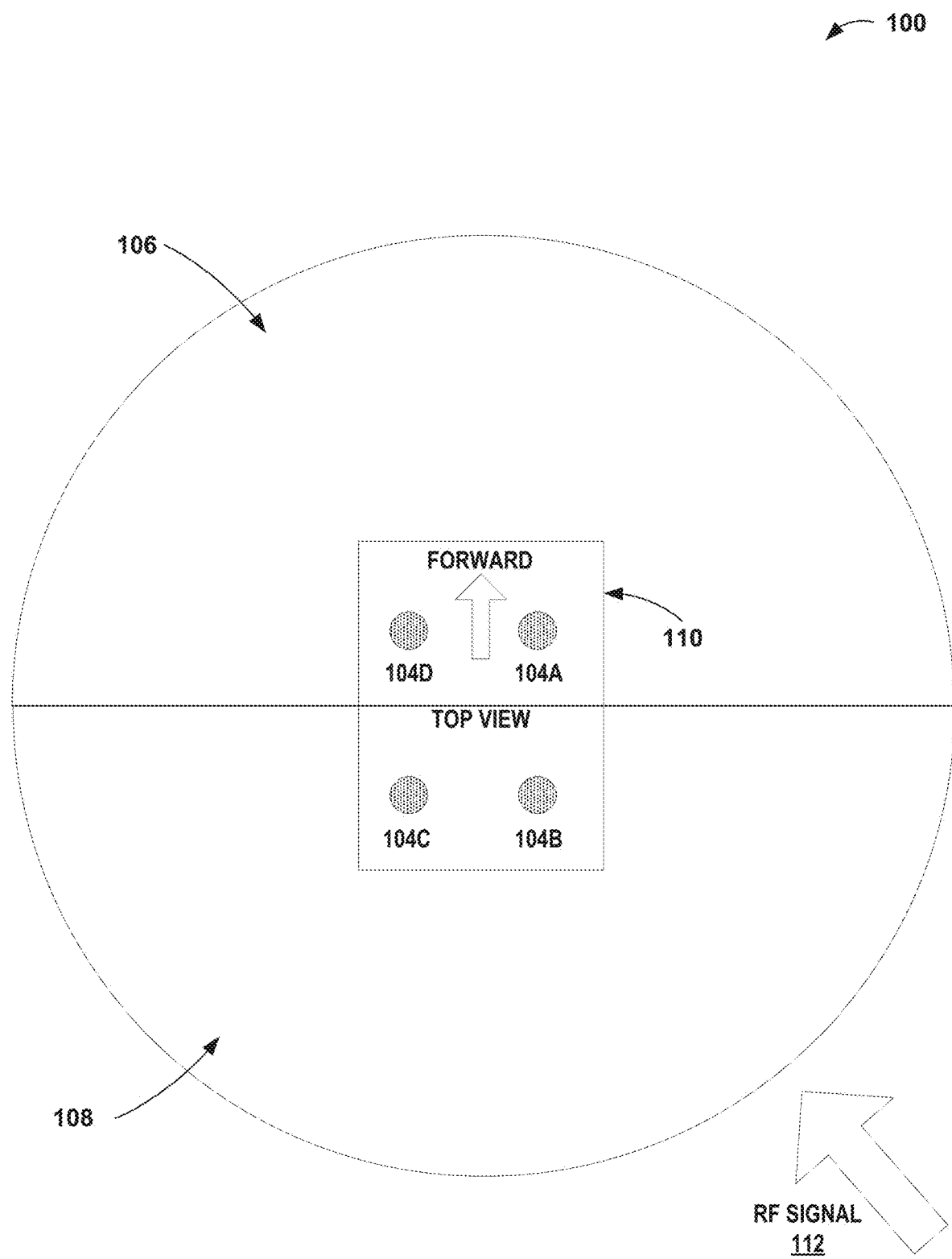
FIG. 1A is a conceptual diagram illustrating an example traffic collision avoidance system (TCAS) antenna system and transmit pattern according to one or more techniques of this disclosure.

FIG. 1A is a conceptual diagram illustrating an example TCAS antenna system and transmit pattern according to one or more techniques of this disclosure. Antenna system 100, in the example of FIG. 1, is an example physical layout of a four-element antenna according to one or more techniques of this disclosure. In other examples, antenna system 100 may have more or fewer antenna elements.

In the example of FIG. 1, antenna 100 includes housing 110 that may provide structural support for antenna elements 304A-304D. In some examples; housing 110 may contain and provide protection for circuitry such as a beamforming network, calibration circuitry, connection ports, and other components of antenna system 100.

Versions of the TCAS standard stipulate a requirement for an antenna system to transmit a four-beam pattern. A four-beam pattern may impose additional costs on the antenna system as well as on the electronics of the TCAS to interface with a four port antenna. In contrast, the TCAS of this disclosure includes a wide transmit beam 106, that spans approximately 180 degrees. In some examples, the TCAS of this disclosure may produce two complementary transmit beams, e.g. 106 and 108, each spanning approximately 180 degrees. In the example of FIG. 1, transmit beam 106 covers the forward direction, and transmit beam 108 covers the aft direction, i.e. toward the tail of an aircraft or other vehicle. In other examples, complementary transmit beams may cover any direction. Complementary transmit beams that cover two directions may, for example, be desirable for TCAS Mode C interrogations. The beam width of either or both of transmit beams 106 and 108 may be greater than 180 degrees in some examples, or less than 180 degrees in other examples. Complementary directions may also be described as substantially opposite directions in this disclosure, such that the complementary transmit beams do not overlap or only have minimal overlap.

The direction of the 180 degree beam may be controlled by the phase relationship, amplitude or a combination of phase and amplitude between the signals sent to the input ports (not shown in FIG. 1) of the two port antenna. In some examples, the direction of the transmit beams from antenna system is predefined to be in two complementary directions, as shown by transmit beams 106 and 108. In other examples, the TCAS, which includes antenna system 100, may control which beam is formed by transmitting or supplying signal on only one port (not shown in FIG. 1) of the two ports. For example, one port, when energized, may cause the antenna elements to form a TCAS transmit beam in direction X. The other port (not shown in FIG. 1) when energized may cause the antenna elements to form a TCAS transmit beam in direction X+approximately 180 degrees.

In other examples, the TCAS may generate a transmit beam by sending switching signals to antenna system 100 via separate conductor. In some examples, the TCAS may generate signals sent via the center conductor of a coaxial cable that connects the TCAS to antenna system 100. A coaxial cable may be one example of a transmission element. In some examples, the separate conductor may be a center conductor, or other conductor of a coaxial able, or a separate control line. In some examples, antenna system 100 may include circuitry to receive the input signals via the input ports and convey the signals to the antenna elements to transmit the TCAS message. In some examples, antenna system 100 may integrate circuitry into the antenna system. In other examples, antenna system 100 may include separate circuitry connected between the input ports and the antenna elements. In other words, the arrangement of antenna elements 104A-104D may form spatial beams for signals transmitted from antenna 100 by varying characteristics of signals, such as phase and amplitude, sent by a transmission/receiving unit of a TCAS coupled to antenna system 100.

Antenna elements 104A-104D may be arranged such that a received signal at antenna 100 may have differences in timing, phase etc. between the different antenna elements. For example, RF signal 112 may arrive at antenna element 104B before antenna element 104D receives RF signal 112. Therefore, there may be a phase difference between the signal conducted to a beamforming network of antenna system 100 from antenna element 1041B and antenna element 104D. Processing circuitry coupled to antenna 100 may use these differences to calculate one or more characteristics of RF signal 112, such as an angle of arrival (AOA).

A two beam, or steerable single transmit beam. TCAS may have some advantages over other types of TCASs. As one example the two-beam, two-port TCAS antenna system may significantly reduce costs when compared to other types of TCASs. In some examples, the transmit beams of a two beam system may transmit simultaneously, or each beam may transmit at different times.

Figure 1B:
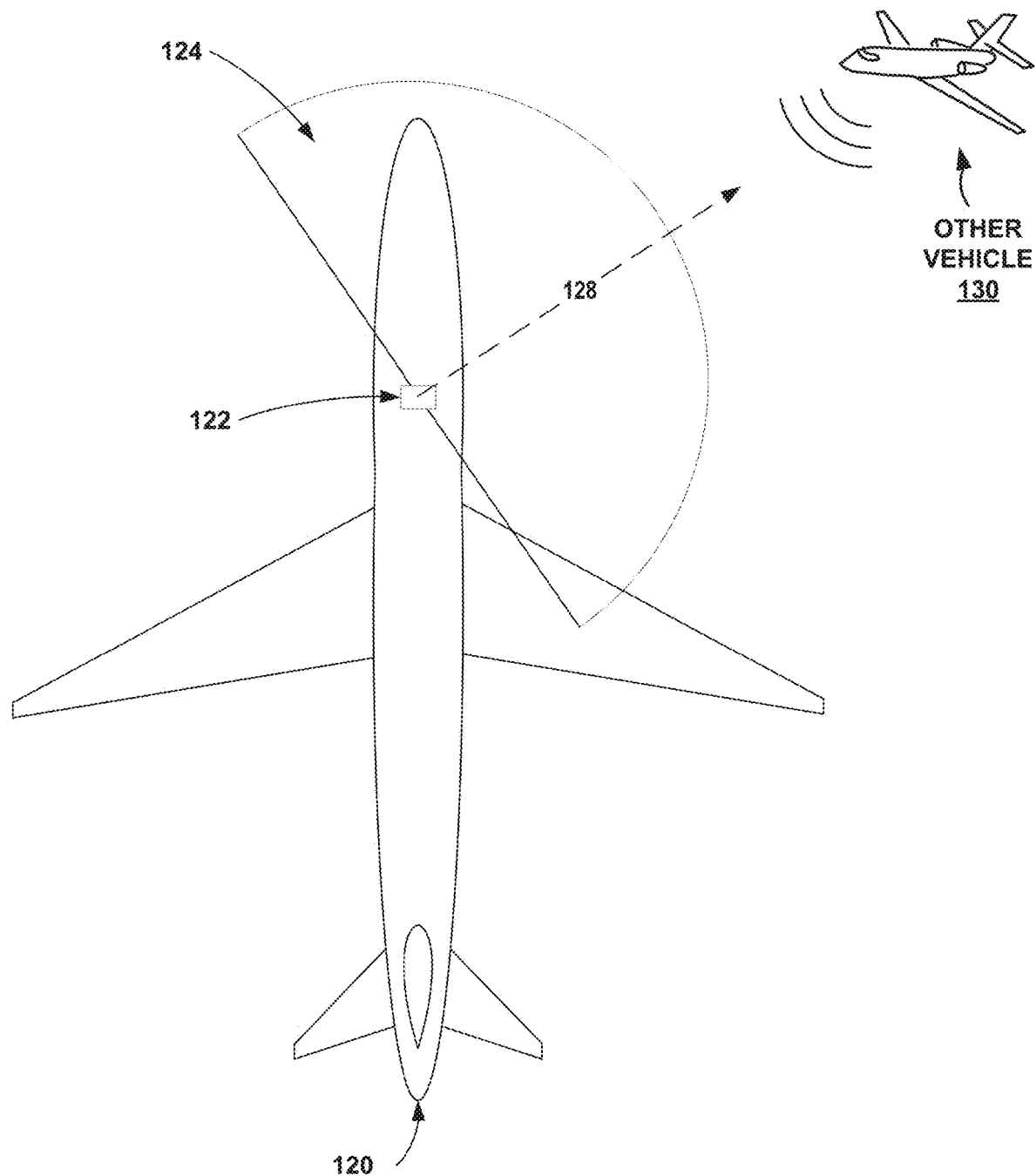
FIG. 1B is a conceptual diagram illustrating an aircraft with a directional TCAS antenna system and steerable transmit beam, according to one or more techniques of this disclosure.

FIG. 1B is a conceptual diagram illustrating an aircraft with a directional TCAS antenna system and steerable transmit beam, according to one or more techniques of this disclosure. FIG. 1B depicts directional TCAS antenna system 122 mounted on aircraft 120. Antenna system 122 is an example of antenna system 110 described above in relation to FIG. 1A and may have the same functions and characteristics as antenna system 110.

As described above in relation to FIG. 1A, transmit beam 124 spans approximately 180 degrees and may be steered to cover any direction. In the example of FIG. 1B, transmit beam 124 is steered by antenna system 122 to center the transmit beam toward other vehicle 130. In some examples, the TCAS aboard aircraft 122 may steer transmit beam 124 to be approximately centered on other vehicle 130 based on surveillance signals received from other vehicle 130. Antenna system 122 may transmit a transponder response signal using transmit beam 124. In other examples antenna system 122 may transmit surveillance signals from aircraft 120.

Directional transmit beam 124 may be desirable for TCAS Mode S interrogations. In other words, for Mode S interrogations a TCAS may steer the transmit beam 124 so that the beam center is near the azimuth 128 of the intruder, e.g. other vehicle 130. In other examples, antenna system 122 may center the transmit beam on a set of four, eight, or some other number of predetermined beam directions. As described above in relation to FIG. 1A, in some examples, the direction of the 180 degree beam may be controlled by the phase relationship between the signals input to the two port antenna. In this disclosure, azimuth refers to an angular relationship along the horizontal plane of the aircraft. In the example of an aircraft, the elevation may refer to a position above or below the aircraft and perpendicular to the wings. Elevation may refer to an angular relationship perpendicular to azimuth and relative to the aircraft. Elevation may also refer to a height above the ground surface.

In the example of FIG. 1B, antenna system 122 is depicted as being mounted to the top side of aircraft 120. In some examples, aircraft 120 may have an additional TCAS antenna system mounted to the bottom of the aircraft to provide additional coverage. For example, for a TCAS II installation, aircraft 120 may include a directional on top and one omni-directional on the bottom.

Figure 2:
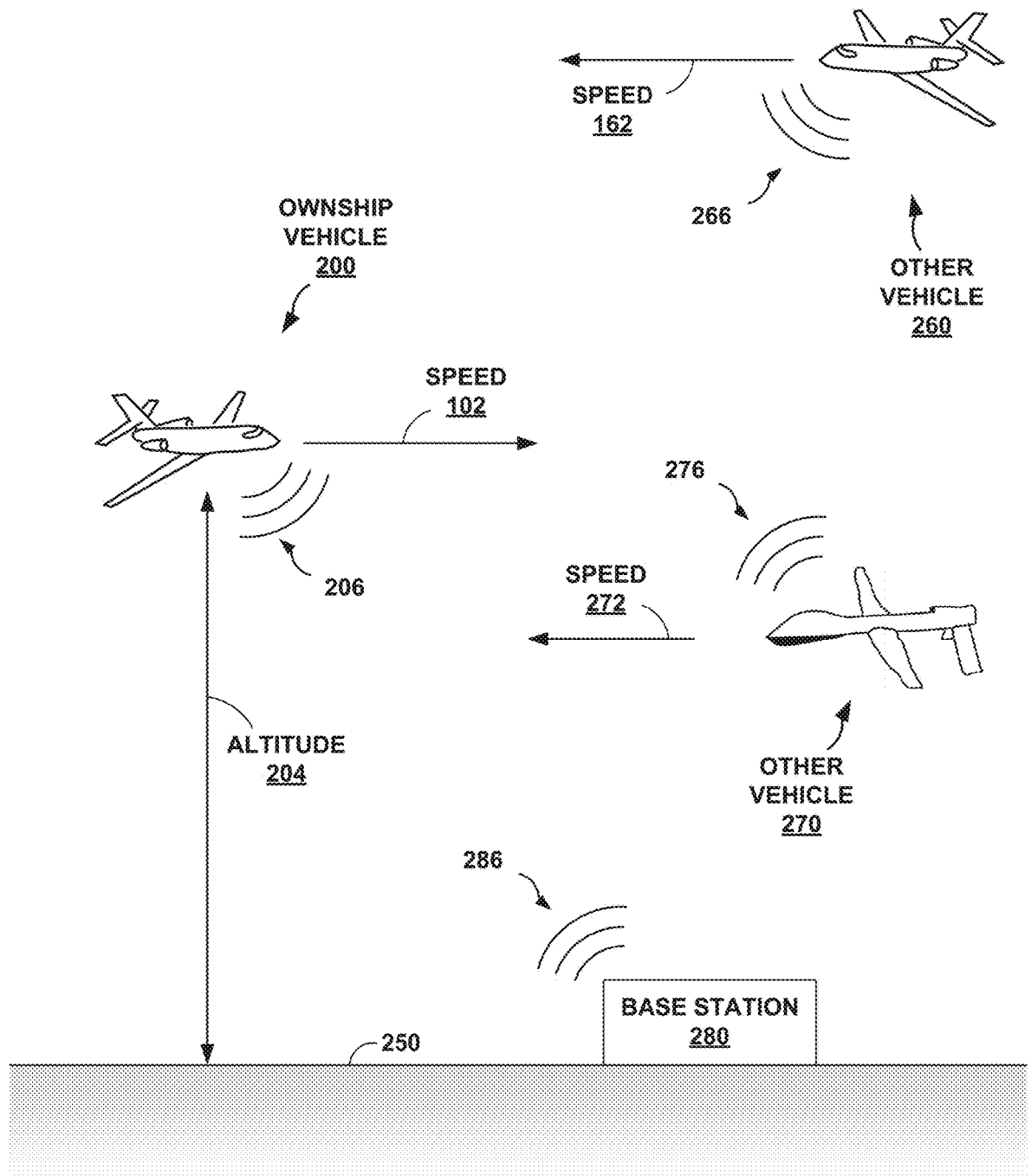
FIG. 2 is a conceptual block diagram of vehicles and a ground station sending and receiving TCAS messages, in accordance with some examples of this disclosure.

FIG. 2 is a conceptual block diagram of vehicles and a ground station sending and receiving surveillance messages, in accordance with some examples of this disclosure. The example of FIG. 2 illustrates three vehicles 200, 260, and 270 sending and receiving surveillance messages 106, 166, and 176, in accordance with some examples of this disclosure. Base station 280 can also send and receive surveillance messages 286 in communication with vehicles 200, 260, and 270. Vehicle 200 is referred to as the "ownship vehicle," because FIG. 2 is described from the perspective of a system of this disclosure mounted onboard vehicle 200.

Although vehicles 200, 260, and 270 are depicted in FIG. 2 as aircraft, vehicles 200, 260, and 270 can be any other vehicle or non-vehicle mobile object. In some examples, vehicles 200, 260, and 270 may be an aircraft other than an airplane, such as a helicopter or a weather balloon. Vehicles 200, 260, and 270 may be space vehicles such as satellites or spaceships. In yet other examples, vehicles 200, 260, and 270 may be land vehicles such as automobiles or water vehicles such as ships or submarines. For non-aircraft vehicles, the transmit frequency may differ from frequencies used by aircraft. Vehicles 200, 260, and 270 can be manned vehicles or unmanned vehicles, such as drones, remote-control vehicles, or any suitable vehicle without any pilot or crew on board. Unmanned aircraft may include fixed and rotary wing unmanned aerial system (UAS) operated by a remote vehicle operator. In some examples the remote vehicle operator may be present at a ground station, such as base station 280. In other examples, the remote vehicle operator may be at a different location but linked to a ground station, such as base station 280 via satellite, ground-based or other communication means.

In some examples, vehicles 200, 260, and 270 may include large commercial aircraft that may be equipped with a suite of sensors, communication equipment, a flight management system (FMS), and other equipment. Some examples of airborne sensors that may be aboard vehicles 200, 260, and 270, or other airborne platforms may include radar such as weather radar, around avoidance radar, radar altimeter, and other active sensors. Passive sensors may include thermometer, pressure sensors, optical sensors such as cameras, including infrared cameras, and similar passive sensors. In some examples, aircraft may include automatic dependent surveillance-broadcast (ADS-B) transmissions and transponder capability (e.g. ADS-B-In and ADS-B-Out), which may provide weather, traffic and collision avoidance information. In some examples vehicles 200, 260, and 270 may communicate with each other, and with air traffic control (ATC) via voice radio or text based systems such as CPDLC.

Base station 280 can be any entity based on ground surface 250 that transmits and/or receives surveillance messages. Base station 280 can also be a marine or an airborne entity. Base station 280 may aggregate and distribute position and velocity data for vehicles 200, 260, and 270. In some examples, base station 280 may be part of a network of base stations that communicate with vehicles 200, 260, and 270 as well as ATC, weather centers and other entities.

Vehicle 200 is configured to determine the location and speed 102 of ownship vehicle 200, including altitude 204. Vehicles 260 and 270 can also determine their locations and speeds 272 and 174. Each of vehicles 200, 260, and 270 may include a Global Navigation Satellite System (GNSS), an inertial navigation system (INS) for determining a turn rate, velocity, and acceleration for the respective vehicle 200, 260, or 270. Each of vehicles 200, 260, and 270 may include an altimeter, an accelerometer, an attitude and heading reference system (AHRS), and/or other sensors and means for determining velocity and other parameters of the respective vehicle 200, 260, or 270.

Vehicles 200, 260, and 270 can transmit surveillance messages 106, 266, and 176 indicating the locations and speeds 202, 262, and 272 of vehicles 200, 260, and 270. Surveillance messages 206, 266, and 276 may be periodic, unprompted broadcasts and/or replies to interrogation messages received from vehicles 200, 260, and 270 and/or base station 280. The surveillance signals can include any form of positioning reporting signals, including Traffic Collision Avoidance System (TCAS), automatic-dependent surveillance-broadcast (ADS-B), automatic identification system (AIS), and/or any other type of position reporting. The standard frequency for the transmission of TCAS interrogation messages is 1030 MHz, and the standard frequency for TCAS reply messages is 1090 MHz. Thus, TCAS equipment transmits interrogations at 1030 MHz and receives replies at 1090 MHz, while the transponder receives the interrogations at 1090 MHz and replies at 1030 MHz. The interrogation signals of the systems of this disclosure may be transmitted in a wide beam, as described above for transmit beam 124 in relation to FIG. 1B. The transponder response signal may be an omni-directional signal.

As described above in relation to FIGS. 1A and 1B, any of vehicles may include one or more directional TCAS antenna systems to transmit and receive TCAS messages. For example, ownship vehicle 200 may include one or more directional TCAS antenna systems described above in relation to FIGS. 1A and 1B in which the transmit beam spans approximately 180 degrees. Other vehicles 260 and 270 may also include the wide transmit beam TCAS of this disclosure. In other examples, other vehicles 260 and 270 may instead include a TCAS that transmits TCAS messages on a four-beam antenna system in which each beam may be approximately 90 degrees. The different types of systems would be able to transmit and receive surveillance signals from either type of TCAS.

Figure 3:
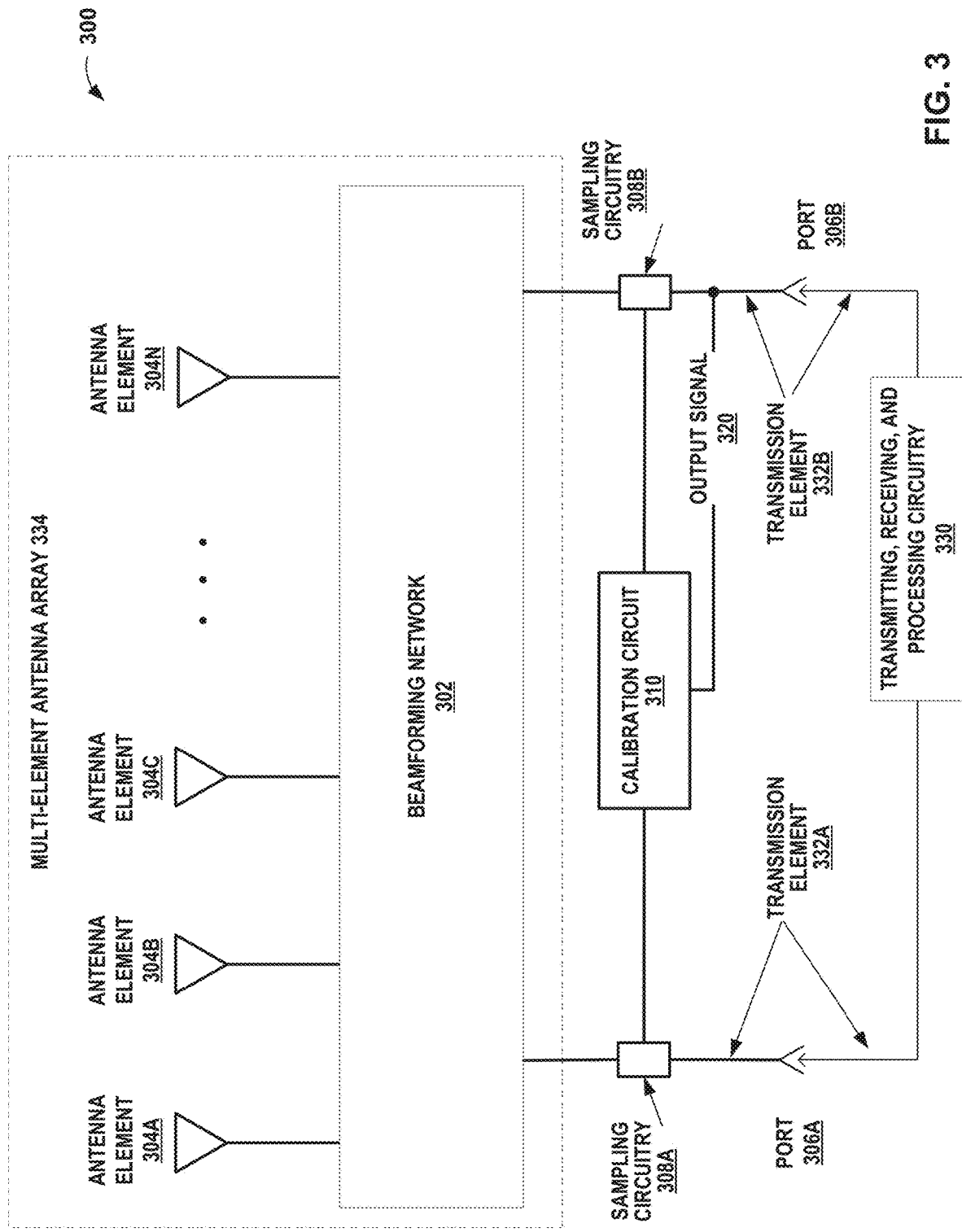
FIG. 3 is a block diagram illustrating an example multi-element antenna system according to one or more techniques of this disclosure.

FIG. 3 is a block diagram illustrating an example multi-element antenna system according to one or more techniques of this disclosure. The multi-element antenna system 300 is an example of TCAS antenna systems 110 and 122 described above in relation to FIGS. 1A and 1B.

Calibration can be accomplished as a one-time measurement in a lab, during manufacturing or at an installation site. In some examples, calibration may be a periodic process to eliminate variation over time caused by, for example, the environmental effects of temperature, altitude, humidity, etc. Periodic calibration may be provided as a built-in function of the system itself with no external support. This process is called self-calibration, Self-calibration may be helpful in applications where extreme environmental variations exist as well as applications with limited access to systems during use. Some examples may include space applications, aircraft and similar applications. In the example of aircraft, systems on board may be subject to extreme environmental variation. For example, an aircraft on the ground in a warm climate may be subject to high air temperatures and humidity and a few minutes later at altitudes above 18,000 feet, the air temperature may be sub-zero.

System 300 may include calibration circuit 310 between beamforming network 302 of multi-element antenna array 334 and transmitting, receiving and processing circuitry (TRP) 330. TRP 330 may also be referred to as TRP unit 330 in this disclosure. In the example of system 300, calibration circuit 310 is electromagnetically coupled to transmission elements 332A and 332B (also referred to collectively as transmission elements 332), by sampling circuitry 308A and 308B (referred to collectively as sampling circuitry 308). In other examples, the calibration circuit may be part of the antenna as well (not shown in FIG. 3).

Multi-element antenna array 334 is a multiple element antenna array that includes beamforming network 302 and at least two antenna elements 304A-304N. Antenna elements 304A, 304B, 304C and so on may be any type of antenna element configured to transmit RF energy and receive RF energy. A dipole antenna may be one example of antenna elements 304A-304N, which may be implemented as patch dipole, top-hat or other types of dipole element. Antenna elements 304A-304N may conduct RF transmit energy signals received from TRP 330 via beamforming network 302 into open space. Antenna elements 304A-304N may also conduct RF energy signals received from other transmitters to beamforming network 302. In some examples, multi-element antenna array 334 may be described as a passive phased array, in contrast to an active phased array. Multi-element antenna array 334, along with input ports 306A and 306B, and in some examples, along with calibration circuit and sampling circuitry 308A and 308B may collectively be referred to as an antenna device, a TCAS antenna or a TCAS antenna system.

In this disclosure, an antenna array may simply be referred to as an antenna. An antenna may include several antenna elements i.e. radiating elements and receiving elements. In some examples, antenna elements may only transmit or only receive, rather than both transmit and receive.

TRP 330 may send TCAS surveillance signals and transponder signals to ports 306A and 306B which cause antenna elements 304A-304N to transmit wide-beam transmit signals, such as transmit signals 106, 108 and 124 described above in relation to FIGS. 1A and 1B. In other words, ports 306A and 306B are configured to receive input signals comprising a TCAS message and conduct the signals to beamforming network 302. As described above, the direction of the 180 degree beam may be controlled by the phase relationship between the signals input to ports 306A and 306B.

Beamforming network 302 may be a form of RF circuitry that combines the multiple antenna radiating element inputs/outputs, e.g. of antenna elements 304A-304N, with closely controlled phase and amplitude relationships. In the example of system 300, beamforming network 302 is a dual input RF circuit. In other examples, beamforming network 302 may have two or more inputs. By varying the phase and amplitudes of the one or more antenna inputs to beamforming network 302, RF spatial transmit beams can be formed to focus transmitted RF energy in selected directions, as described above in relation to FIG. 1B. Also, by determining phase differences and timing differences between RF signals received by antenna elements 304A-304N, TRP 330 may determine a direction from which an RF signal was received, i.e. the angle of arrival (AOA). Beamforming network 302 may also be described as beamforming circuitry in this disclosure.

TRP 330 may also be referred to as a transmitter/receiver unit. Transmission elements 332 conduct RF energy between TRP 330 and beamforming network 302. In some examples, transmission elements from TRP 330 may connect to transmission elements 332 of multi-element antenna array 334 via connection ports. In the example of system 300, port 306A connects transmission element 332A to TRP 330 while port 306B connects transmission element 332B to TRP 330. Therefore, transmission element 332A and transmission element 332B each have respective transmit-path and receive-path functionality. The transmit-path functionality applies for the higher energy RF signals from TRP 330 to multi-element antenna array 334. The receive-path functionality applies to the relatively lower energy RF signals conducted to TRP 330 from antenna elements 304A-304N of multi-element antenna array 334.

Transmission elements 332 may be implemented by any type of conductor configured to carry RF energy of the frequency and power used by system 300. In some examples transmission elements 332 may be shielded cables, such as coaxial cables, or other types of cables, waveguides and similar components that carry RF energy. In the example of a waveguide, a separate DC conducting transmission element may be added to carry the calibration output signal to the TRP.

In the example of FIG. 3, calibration circuit 310 includes a first sampling component, shown in FIG. 3 as sampling circuitry 308A electromagnetically coupled to the first transmission element 332A. Sampling circuitry 308A is configured to sample a first transmit signal sent via transmission element 332A from TRP 330 to multi-element antenna array 334. Calibration circuit 310 also includes a second sampling component, sampling circuitry 308B, electromagnetically coupled to the second transmission element 3329 and configured to sample a second transmit signal sent via transmission element 332B to multi-element antenna array 334. In some examples, sampling circuitry 308 may be components that are separate from calibration circuit 310 but connected to calibration circuit 310. Calibration circuit 310, and the associated connectors may also be referred to as calibration circuitry in this disclosure.

Calibration circuit 310 is configured to generate output signal 320 based at least in part on the first transmit signal and the second transmit signal. Output signal 320 includes information used to determine an amplitude offset and phase offset associated with the transmit-path functionality of the transmission element 332A and transmission element 332B. In some examples, the information used to determine an amplitude offset and phase offset is determined when the first transmit signal and the second transmit signal produce a null voltage in output signal 320. When the first transmit signal and the second transmit signal produce a null voltage in output signal 320 the first transmit signal is determined to be 180 degrees out of phase with the second transmit signal at the inputs of the calibration circuit.

The example of system 300 depicts output signal 320 coupled back onto transmission element 332B, where TRP 330 may receive output signal 320 via port 306B. However, in other examples, output signal 320 may be coupled to either or both of transmission elements 332 or to a separate transmission element (not shown in FIG. 3) specifically used for calibration signal functionality.

In some examples, TRP 330 may receive output signal 320 and perform the calibration procedure for the transmit-path functionality, i.e. send the first transmit signal via transmission element 332A and the second transmit signal via transmission element 332B, then vary the phase and/or amplitude of either the first transmit signal or the second transmit signal until output signal 320 outputs a null voltage. Based on the relationship between the amplitude and phase of the first transmit signal compared to the second transmit signal, TRP 330 may determine the phase and amplitude offsets induced by the combined transmission elements, and any phase and amplitude offsets induced by the transmitter or receiver circuitry. TRP 330 may apply these phase and amplitude offsets to accurately control the beam direction and other characteristics of the transmitted RF signal from multi-element antenna array 334. In some examples, the phase and amplitude offsets for the transmit-path functionality may be referred to as transmission calibration constants.

The results from calibration circuit 310 are used to determine the amplitude offset and phase offset associated with the receive-path functionality of system 300. That is, the results from calibration circuit 310 are used to determine the amplitude and phase settings of the TRP to generate receive path calibration input signals with known phase and amplitude associated with the receive path functionality of system 300. For example, TRP 330 may transmit a third transmit signal to multi-element antenna array 334 via transmission element 332A and monitor the phase and amplitude of the receive circuitry connected to transmission element 332B. In the example of FIG. 3, receive circuitry connected to transmission element 332B may include antenna elements 304 as well as beamforming network 302. The third transmit signal may be set by applying the transmit phase and amplitude offsets (transmission calibration constants). Said another way, calibration circuit 310 may be considered to be indirectly involved in determining receive calibration constants by establishing the transmit calibration constants that TRP 330 may use to determine and set up the relative phase of the input signals used while determining the receive function calibration constants.

Subsequently, TRP 330 may measure the signal received by receive circuitry in multi-element antenna array 334 that is connected to transmission element 332A while transmitting a fourth transmit signal to multi-element antenna array 334 via transmission element 332B and port 306B. Similar to the third transmit signal, the fourth transmit signal may apply transmission calibration constants determined from the transmit-path functionality calibration. In some examples, the fourth transmit signal may be the same as the third transmit signal. TRP 330 may measure the respective phases and amplitudes of signals received while transmitting the third transmit signal and the fourth transmit signal and thereby determine the amplitude offset and phase offset associated with the receive-path functionality of transmission elements 332 (i.e. the receive calibration constants).

In some examples, determining the receive calibration constants may be accomplished by sending the first transmit signal via transmission element 332A and measuring, using receive processing circuitry of TRP 330, the phase and amplitude of the signal received at transmission element 332B. The signal received at transmission element 332B in the example of FIG. 3, may be the first transmit signal from antenna elements 304 coupled to transmission element 332A via beamforming network 302. The first transmit signal may be received by other antenna elements 304 coupled to transmission element 332B via beamforming network 302.

Subsequently, the transmission and receive roles of transmission elements 332A and 332B may be reversed. That is, the second transmit signal sent via transmission element 332B may be transmitted by transmission elements 304 and received by other transmission elements 304 coupled to transmission element 332A via beamforming network 302. Receive processing circuitry of TRP 330 coupled to transmission element 332A may measure the phase and amplitude of the signal received by transmission element 332A. In this way TRP 330 may measure the receive path functionality of system 300 via both transmission elements 332A and 332B coupled to the input components of beamforming network 302. By applying the offsets determined during the transmission path calibration to the measured phase and amplitude characteristics for each transmission path, TRP 330 may determine the receive calibration constants for the receive path functionality of system 300. The exact phase setting of either receive calibration transmit signal may be varied, as long as the relative offset value determined during transmit calibration is known and applied to the receive calibration calculation.

Following calibration, system 300 may accurately control characteristics of transmissions from multi-element antenna array 334. For example, system 300 may steer a TCAS transmit beam so that the beam center is near the azimuth of an intruder, e.g. other vehicle 130 depicted in FIG. 1B. In other examples, system 300 may center the transmit beam on a set of four, eight or some other number of predetermined beam directions, or form two complementary 180 degree TCAS transmit beams, as depicted in FIG. 1A.

Similarly, system 300 may accurately determine characteristics of signals received by multi-element antenna array, such as AOA. In other words, system 300 may be configured to operate in calibration mode and in a normal system operation mode. In calibration mode, TRP 330 may generate and output the signals used for calibration. In normal system operation mode, TRP 330 may generate and output signals to ports 306A and 306B to cause multi-element antenna array 334 to output RF a wide beam width transmit beam that includes a TCAS message. In some examples, processing circuitry within TRP 330 may cause transmitter circuitry to generate and output the signals to ports 306A and 306B.

The techniques of this disclosure may provide advantages over other calibration techniques. For example, the calibration circuit of this disclosure may be applied to nearly any multi-element antenna array with two antenna inputs. A multi-element antenna array with two inputs may use less cabling than other multi-element antenna arrays, e.g. a four element antenna array may require 4 cables, which in the example of an aircraft, may add significant weight and complexity. The calibration circuit of this disclosure may provide self-calibration capability to many varieties of multi-element antennae.

Figure 4:
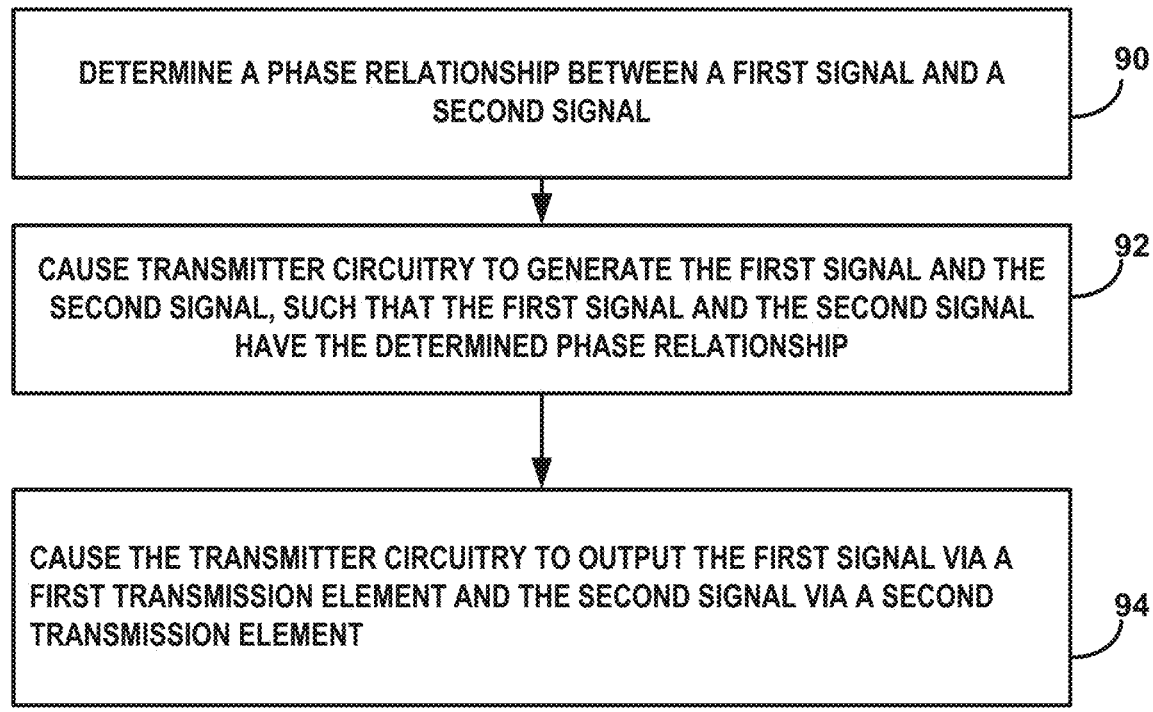
FIG. 4 is a flow diagram illustrating an example operation of a TCAS antenna system, according to one or more techniques of this disclosure.

FIG. 4 is a flow diagram illustrating an example operation of a TCAS antenna system, according to one or more techniques of this disclosure. The blocks of FIG. 4 will be described in terms of FIG. 3 and FIG. 1B, unless otherwise noted.

Processing circuitry, such as may be included in TRP 330, may determine that a specific phase relationship and/or amplitude difference between a first signal and a second signal (90) may cause a transmit beam to form with a desired beamwidth, such as approximately 180 degrees as well as center on a desired direction. As described above in relation to FIG. 1B, the beam center may be directed toward a desired azimuth, such as straight in front of a vehicle, or in some examples, may be directed toward another vehicle.

The processing circuitry may cause transmitter circuitry, such as the electronics within TRP 330, to generate the first signal and the second signal, such that the first signal and the second signal have the determined phase relationship and/or amplitude relationship (92). An amplitude relationship may include an amplitude difference, amplitude ratio or similar relationship.

The processing circuitry may cause the transmitter circuitry to output the first signal via a first transmission element and the second signal via a second transmission element, e.g. transmission elements 332A and 332B (94). As described above in relation to FIG. 3, the first transmission element may be coupled to a first input port of a TCAS antenna, e.g. 306A. Similarly, the second transmission element may be coupled to a second input port of the TCAS antenna, e.g. port 306B.

A beamforming network between the input ports and the antenna elements may process the signals received at the input ports to output the transmit beam in the desired direction and beam shape. For example, the beamforming network may include dividers, combiners and other RF components to convey the received signals to the associated antenna elements and transmit the TCAS signal in the desired direction and beam shape, based on the characteristics of the input signals.

In one or more examples, the functions described above may be implemented in hardware, software, firmware, or any combination thereof. For example, the various components of FIG. 3, such as TRP 330, may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more DSPs, general purpose microprocessors, ASICs, FPGAs, or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described Various examples of the disclosure have been described. These and other examples are within the scope of the following claims.

What is claimed is:

1. A Traffic Collision Avoidance System (TCAS) antenna device, the antenna device comprising:
    a plurality antenna elements;
    wherein a beam width of a single transmit beam, from the plurality of antenna elements, is approximately 180 degrees in azimuth, and
    wherein the transmit beam includes a transmitted TCAS message.

2. The device of claim 1,
    wherein the device includes circuitry configured to receive input signals comprising the TCAS message via only two input ports and transmit the TCAS message via two or more antenna elements of the plurality if antenna elements, and
    wherein the beam width and beam direction are based on a phase and amplitude of the input signal received at the two input ports.

3. The device of claim 2, wherein the beam width and beam direction are controlled by a phase relationship between the input signals received at the two input ports.

4. The device of claim 1, wherein the device steers the beam direction such that a beam center is approximately in the same direction as an azimuth from the device to a vehicle separate from the device.

5. The device of claim 4,
    wherein the device steers the beam direction in one of a plurality of predetermined azimuths relative to the device, and
    wherein a selected azimuth of the plurality of predetermined azimuths is configured such that the beam center is approximately in the same direction as the azimuth from the device to the vehicle separate from the device.

6. The device of claim 5, wherein a number of predetermined azimuths is eight.

7. The device of claim 1, wherein the TCAS message comprises a surveillance message.

8. The device of claim 1, wherein the TCAS message comprises a interrogation message.

9. The device of claim 1, further comprising:
    two input ports configured to receive input signals comprising the TCAS message; and
    calibration circuitry configured to output calibration signals used to adjust a phase and amplitude of the input signals.

10. A Traffic Collision Avoidance System (TCAS), the system comprising:
    a TCAS antenna device comprising:
        a plurality of antenna elements configured to output a single transmit beam that includes a TCAS message, wherein a beam width of the single transmit beam is approximately 180 degrees in azimuth; and
    processing circuitry configured to:
        generate input signals received by the TCAS antenna device, wherein the input signals comprise the TCAS message;
        adjust one or more characteristics of the input signals to control the beam width and a beam direction of the transmit beam.

11. The system of claim 10, wherein the one or more characteristics of the input signals include a phase and an amplitude of the input signals.

12. The system of claim 10, wherein the a TCAS antenna device is a first TCAS antenna device and the system is mounted on an aircraft, the system further comprising a second TCAS antenna device mounted on the aircraft in a different location from the first TCAS antenna device.

13. The system of claim 11, wherein the TCAS antenna device is configured to output a first transmit beam centered on a first direction and a second transmit beam centered on a second direction, wherein the second direction is complementary to the first direction.

14. The system of claim 11, wherein the TCAS antenna device steers the beam direction such that a beam center is approximately in the same direction as an azimuth from the device to a vehicle separate from the device.

15. The system of claim 14,
    wherein the TCAS antenna device steers the beam direction in one of a plurality of predetermined azimuths relative to the device, and
    wherein a selected azimuth of the plurality of predetermined azimuths is configured such that the beam center is approximately in the same direction as the azimuth from the device to the vehicle separate from the device.

16. The system of claim 10,
    wherein the device includes circuitry configured to receive the input signals comprising the TCAS message via two input ports and transmit the TCAS message via the two or more antenna elements, and
    wherein the characteristics of the input signals comprise a phase relationship between the input signals received at the two input ports.

17. A method comprising:
    determining, by processing circuitry, a relationship between a first signal and a second signal;

causing, by the processing circuitry, transmitter circuitry to generate the first signal and the second signal, such that the first signal and the second signal have the determined relationship;

causing, by the processing circuitry, the transmitter circuitry to output the first signal via a first input port of a Traffic Collision Avoidance System (TCAS) antenna device, causing, by the processing circuitry, the transmitter circuitry to output the first signal via a second input port of the TCAS antenna device, wherein:

the TCAS antenna device comprises a plurality of antenna elements coupled to the first input port and the second input port, the first signal and the second signal cause the plurality of antenna elements to output a TCAS transmit beam, wherein the TCAS transmit beam has a beam width of approximately 180 degrees in azimuth, and wherein the TCAS transmit beam includes a transmitted TCAS message.

18. The method of claim 17, wherein the beam width and beam direction of the TCAS transmit beam are based on the relationship between the first input signal and the second input signal, and wherein the relationship comprises a phase difference and an amplitude difference between the first signal and the second signal.

19. The method of claim 17, wherein the TCAS transmit beam is a first TCAS transmit beam, wherein the processing circuitry causes the antenna elements to output the first TCAS transmit beam centered on a first direction and a TCAS second transmit beam centered on a second direction, wherein the second direction is complementary to the first direction.

20. The method of claim 17, wherein the processing circuitry causes the antenna elements to steer the TCAS transmit beam direction such that a beam center is approximately in the same direction as an azimuth to a vehicle separate from the TCAS antenna device.

* * * * *